United States Patent [19]

Della Vedova

[11] 4,015,128

[45] Mar. 29, 1977

[54] DEVICE FOR AND METHOD OF CONTROLLING THE LEVEL IN APPROPRIATE CONTAINERS OF A LIQUID WHICH WILL EMIT INFRA-RED RAYS AND, IN PARTICULAR, THE LEVEL OF MOLTEN METAL

[75] Inventor: Ferruccio Della Vedova, Pozzuolo Del Friuli, Italy

[73] Assignee: CEDA, S.p.A., Buttrio (UD), Italy

[22] Filed: July 28, 1975

[21] Appl. No.: 599,477

[30] Foreign Application Priority Data

Sept. 26, 1974 Italy .................................. 83404/74
Sept. 26, 1974 Italy .................................. 83405/74

[52] U.S. Cl. ............................. 250/342; 250/349; 250/357; 250/577
[51] Int. Cl.² ........................................ G01N 21/26
[58] Field of Search .......... 250/342, 349, 357, 577; 356/109, 156, 157

[56] References Cited

UNITED STATES PATENTS

| 3,794,477 | 2/1974 | Farabaugh et al. ............ 250/349 X |
| 3,805,072 | 4/1974 | Goerens et al. .................. 250/342 |

*Primary Examiner*—Archie R. Borchelt
*Attorney, Agent, or Firm*—A. W. Breiner

[57] ABSTRACT

A device for controlling the level in a container of a liquid which will emit infra-red rays and particularly molten metal is described. The device comprises a housing, at least one longitudinal window at one end of the housing and arranged so that when in use it will overlook an edge of a container containing the liquid, the level of which is to be controlled; and at least one photo-element for sending out an electrical signal through said window to said liquid; at least one second window which is substantially punctiform and which overlooks a substantially constant portion of the liquid in the container and within the vertical field of adjustment; and a second photo-element in cooperation with the second window for sending out a pilot signal, and circuitry to correct the signal indicating the liquid level of the container by means of the pilot signal and for amplifying and comparing the signal coming from the correction circuit. The device when in use is positioned so that the optical axis thereof is at an angle to a line vertical to the liquid level in the container, whereby the longitudinal window cooperates with the edge of the liquid containing container, the level of which is to be measured and controlled. Additional windows and photo-electric elements can be utilized to accomplish ancillary functions, including adjusting the speed of withdrawal of liquid from the container and/or to adjust the quantity of liquid in the container as, for example, in a continuous casting ingot mold. The device is simple in construction, easily operated, and accurate.

25 Claims, 17 Drawing Figures

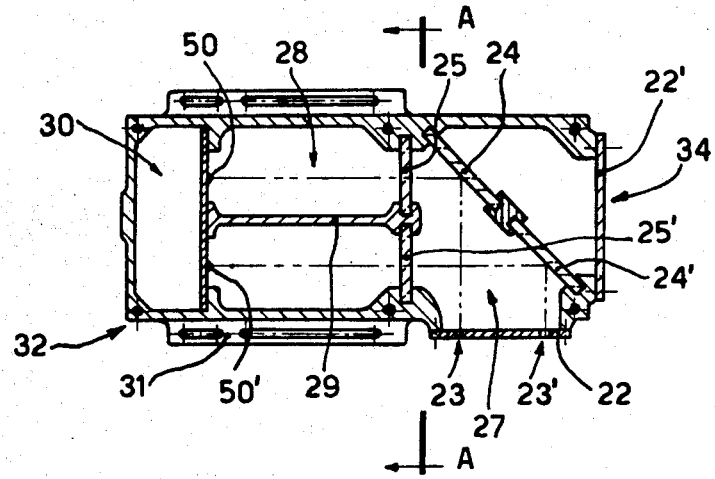
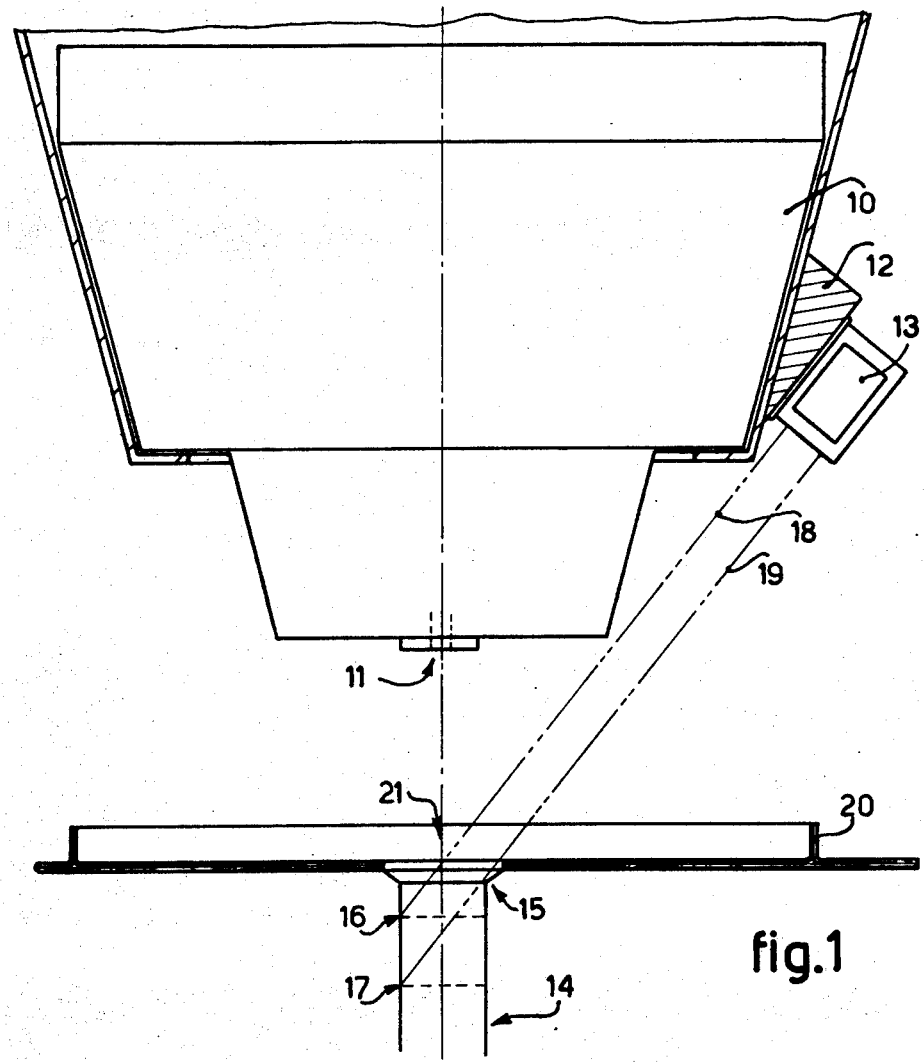

DEVICE FOR AND METHOD OF CONTROLLING THE LEVEL IN APPROPRIATE CONTAINERS OF A LIQUID WHICH WILL EMIT INFRA-RED RAYS AND, IN PARTICULAR, THE LEVEL OF MOLTEN METAL

FIELD OF INVENTION AND BACKGROUND

The present invention is directed to a device for controlling the level of a liquid in a container which will emit infra-red rays, the device being particularly suitable for controlling the level of molten metal in a container. More particularly, the present invention is directed to a device for measuring the height of the level in a container of a liquid which emits infra-red rays, the device providing information and having controls which can be used for conditioning said level. In accordance with preferred applications, the device is used for controlling the level of molten metal in a container in a continuous-casting ingot mould; or for controlling the level of molten metal in a pig-iron ladle, which may be independent or may be coupled to one or more ingot moulds. Other applications are possible wherever it is necessary to ascertain and perhaps to control within a suitable container the level of a liquid which will emit infra-red rays.

As is known, measurement of the level of a liquid in a container is necessary to prevent the level from deviating from certain lower or upper limits. In a continuous-casting ingot mould, where the solidifying metal is discharged continuously from the bottom while the mould is continuously being filled with liquid metal from above, the level is important with a view to maintaining, among other things, a speed such as to avoid overflowing or fracturing of or in the billet. A system for controlling such levels by means of thermocouples is known, but the system is difficult and costly to construct because the thermocouples must be installed in the ingot mould or in the container. Another known system makes use of a source of radioactive isotopes positioned on one side and cooperating with means on the other side for measuring the radioactive emissions which pass through the container. The presence or absence of the molten metal conditions the passage through the container and the variation is read by a measuring device which obtains therefrom the values required to establish the level of the liquid. However, such a system is not acceptable to industry owing to the real or hypothetical dangers inherent in every source of radioactive radiation. Moreover, installation of such a system is costly.

OBJECTS AND GENERAL DESCRIPTION OF INVENTION

Accordingly, the present invention is directed to a device which avoids all the disadvantages of the prior art systems, and makes possible a constant control of the level of a liquid in a container including molten metal. The invention is based on the photo-conductivity of select elements which adapt their own conductivity to the level of luminous radiation which strikes them. In accordance with the invention the photo-elements which can be used are varied, but semiconductors are preferred and, in particular, those semiconductors commonly referred to as photodiodes.

In the disclosed invention, the edge of the container for the liquid acts as a fixed baffle plate, and it is the variation of the level of liquid which modifies the amount of luminous radiation that strikes the photoelements. To be more specific, the device receives the luminous radiation sent out by a bath of liquid metal through a window that overlooks the bath of metal longitudinally. If the level of the metal is raised or lowered, the section of the bath affecting the window is varied. If the temporary position of the bath/fixed baffle plate(edge)/window/photo-elements is such that at the maximum level the whole window is affected by the luminous radiation of the whole bath, then by lowering the level the intervention of the fixed baffle plate will limit the longitudinal section of the bath which is able to send out luminous radiation through the window. Accordingly, the amount of luminous energy that passes through the window will vary with any variations in the level of the bath. The inclination or angle of incidence with which the device overlooks the bath conditions or modifies the size of the change between maximum and minimum levels affected by the control applied by the device. In order to improve performance, wherever the photo-elements are substantially punctiform (shaped like, or in the form of, dots), as in the case of a light-sensitive diode, a lens is placed between the window and the photo-elements, and the focal point of this lens will coincide substantially with the photo-element. If the amount of luminous energy received from the photo-elements is varied, then the conductivity of the photo-elements themselves will also vary, and this level of conductivity can be measured and thus related to the temporary level of the liquid by means of a known system. This level of conductivity may, for example, be measured only when it is higher than a determined minimum value so as to avoid false signals caused by information which does not always depend on the luminous emission sent out by the bath itself.

If the measured level is compared with a pilot level, it is possible to obtain a control signal. The control signal may be such as to require an increase in the level of the bath or to require the level of the bath to be lowered with a view to maintaining said level with the pre-established limits. By using such a single it is, therefore, possible to condition the level of the liquid by means of appropriate servomechanisms or servosystems by acting on the delivery of the supplying source or on the discharge of the liquid metal present in the container. Depending on the situation, this signal may be periodical or continuous or on and off, and this will depend on the servomechanisms with which action can be taken to maintain optimum conditions.

The above description establishes the principle on which the invention is based. In accordance with its practical realization, the device will include a check to compensate for the luminous intensity sent out by the bath. This compensatory or corrective check is necessary so as to be able to bring to a standard level the other proportional signal which reflects the level of the liquid. It has been noted that a variation in the temperature of the bath has an effect on the amount of radiation sent out by the bath itself, and this variation may be mistakenly read by the device controlling the level as being a variation in the level of the bath and not as being a variation in the temperature thereof. Since in such a case the signal coming out would be a wrong signal, an independent reading of the temperature of the bath is carried out. This reading, which is also carried out by a photo-element, makes it possible to obtain a signal that is proportioned or substantially proportioned to the temperature of the bath. This is made possible since an appropriate small window cooperating with a photo-element examines a substantially punctiform area of the level of the liquid metal and continues to examine the same area irrespective of variations in said level; in this way it is possible for the photo-element to be affected by a constant amount of radiation, provided that the temperature does not change, even if the level of the bath alters. By correcting the signal relating to the level with the proportioned signal relative to the temperature, it is possible to obtain the signal normalized to the effective temperature of the bath. With a view to making the principle clear, the other variables which affect the amount of radiation sent out by the bath of molten liquid have purposely been neglected hereinbefore.

Where the device has to condition the level of molten metal in a continuous-casting ingot mould, another difficulty must be overcome, namely any deviation or malformation in the flow of molten metal coming out from the casting ladle or pig-iron ladle. To overcome this difficulty the device is provided with a double pair of scanning elements, of which each pair overlooks its own portion of the ingot mould. If the flow is well centered, as it should be, the scanning takes place on the two sides of the flow between the flow and the wall of the ingot mould. In this case the two signals coming out are the same and the subsequent processing takes place on said signals, which are used as if they were only one. If, on the contrary, the flow is off center, the scanning device affected by the flow itself is cut out. This cutting out may be done manually or may be automated with the assistance of a third small window cooperating with a third photo-element, which measures the position of the flow. In order to avoid situations where mounting is especially difficult, it is possible to rearrange the lenses so as to obtain a front focus as well as a back focus. This enables the free space required for an uninterrupted surveillance from the small windows to be reduced, and all mounting requirements are thus met.

In accordance with one layout of the device, the window which checks the level of the liquid cooperates with one single photo-element. If there are two windows, one for each side of the ingot mould, there will be two photo-elements. In this case the photo-element is positioned substantially at the focal point of the lens, which is placed between the window and the photo-element. In accordance with a variant of the above layout, the device will have, in a position between the focal point of the lens and the lens itself, a plurality of photo-elements which will all be affected substantially by an equal part of the ray leaving the lens. In accordance with another variant, instead of one single lens there may be two or more lenses affected by the same window and each of them might affect one or more photo-elements.

Accordingly, the invention comprises a device for controlling the level in a container of a liquid which sends out infra-red rays and, in particular, the level of molten metal in continuous-casting ingot moulds, said device being characterized by the fact that it comprises in reciprocal coordination and cooperation a structure or housing having at least one window longitudinally overlooking the portion of a bath (the liquid in the container) made visible over the edge of the container by the position of the level of the liquid and cooperating with at least one photo-element to send out a signal indicating the level, at least one second, substantially punctiform, window overlooking a substantially constant portion of the bath level within the vertical field of the adjustment thereof and cooperating with a photo-element to send out a pilot signal, a circuit to correct the signal indicating the level by means of a pilot signal, a circuit to amplify and compare the signal coming out of said correction circuit, and a control circuit linked to said circuit for amplifying and comparing the signal, wherein the optical axis of the device is positioned at an angle to a line vertical to the level of the liquid bath and wherein said longitudinal window cooperates with the edge of the container.

DRAWING AND SPECIFIC EMBODIMENTS

Preferred non-limitative embodiments of the device will be made with reference to the attached drawing which are provided for exemplificative purposes.

In the drawing,

FIG. 1 is an illustrative assembly of the device of the invention connected to a continuous-casting ingot mould;

FIG. 2 illustrates a preferred layout of the device of the invention, seen in vertical section;

Figure 7:
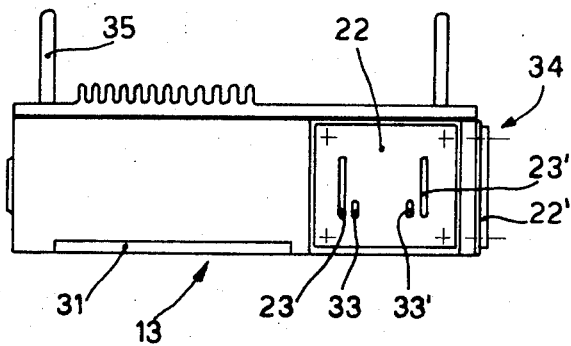
Figure 8:
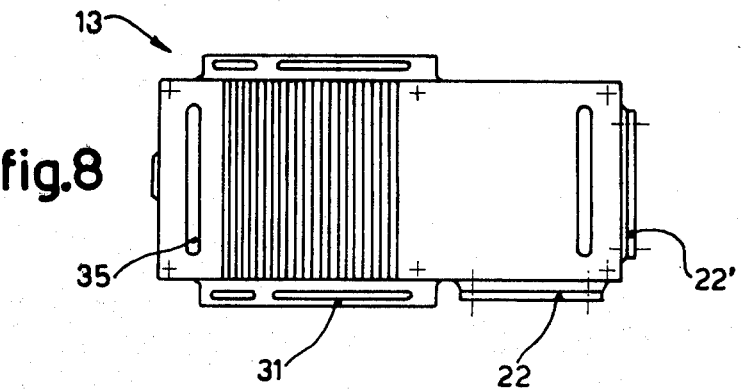
Figure 9:
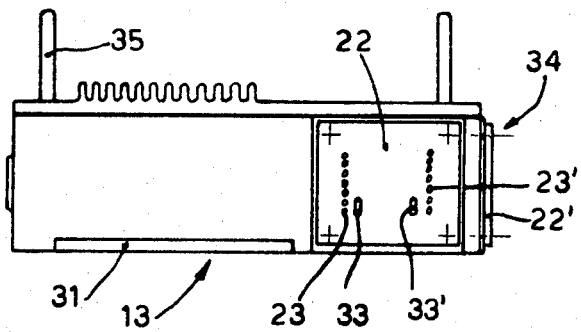
Figure 10:
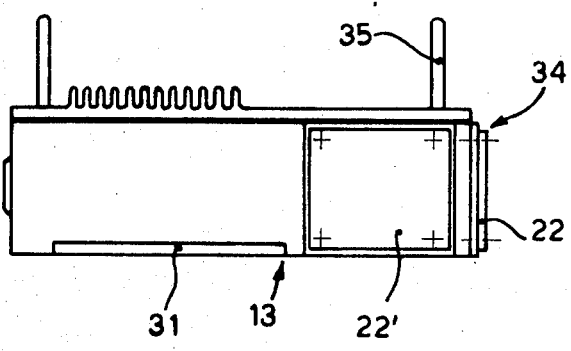
Figure 11:
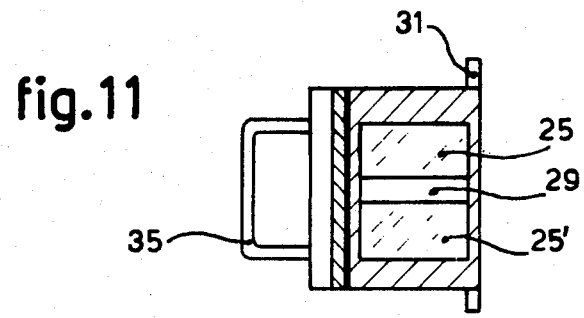
Figure 12:
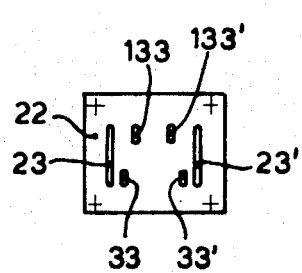
Figures 13A, 13B:
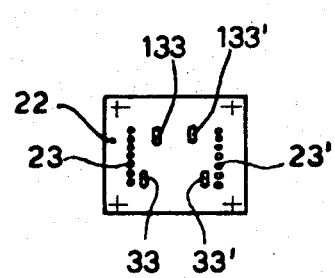
Figure 14:
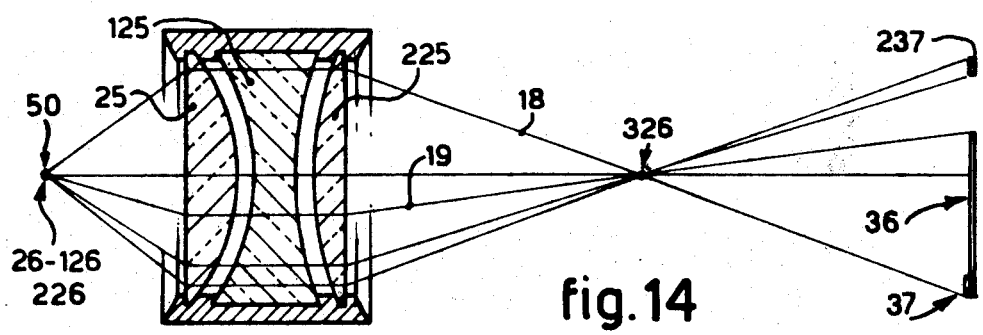
Figure 15:
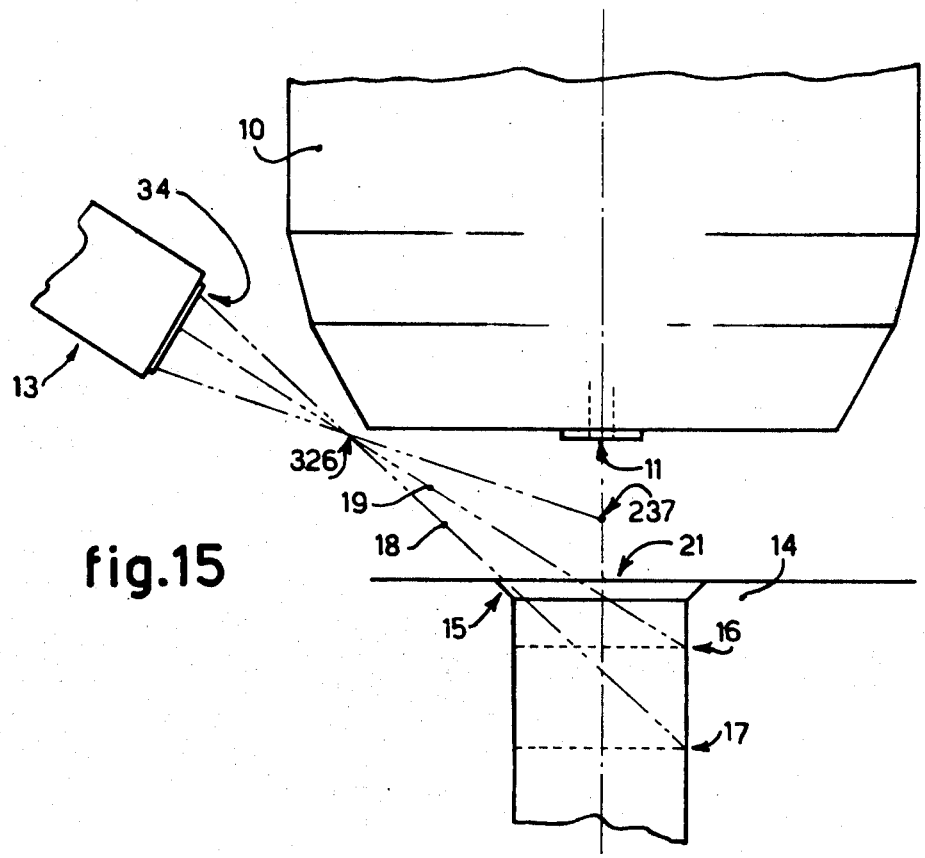
Figure 16:
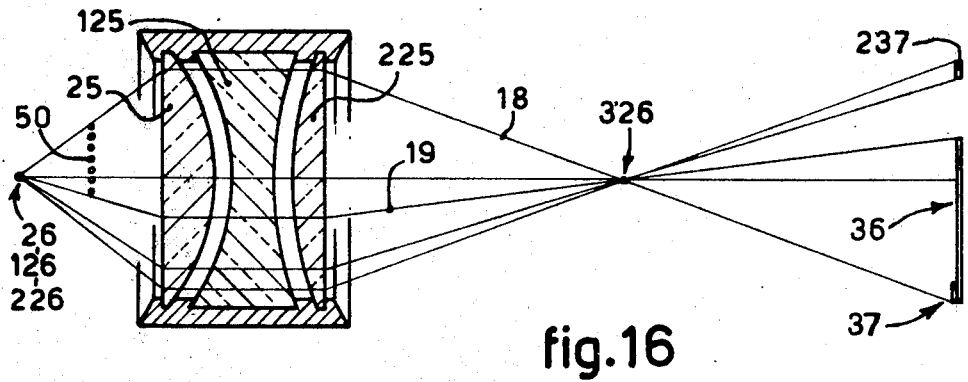

FIGS. 7 and 8 give views of the device of FIG. 2 from below and from the side;

FIG. 9 illustrates a variant of the device of FIG. 7;

FIG. 10 illustrates a variant of the device of FIG. 2, wherein the bath is examined directly without the interposition of mirrors;

FIG. 11 illustrates a section of the device of FIG. 2 in accordance with lines A—A;

FIG. 12 illustrates a variant of the front cover adopted in the layout of FIG. 7;

FIGS. 13a and 13b illustrate two variants of the cover of FIG. 12;

FIGS. 14 and 15 illustrate a variant of the layout, wherein a front focus and back focus are provided, and FIG. 16 illustrates a variant of the layout of FIG. 14.

In the figures the same parts or parts performing the same functions are given the same reference numbers.

In the figures: 10 is the casting ladle or pig-iron ladle containing molten metal which flows from lower hole 11, which is substantially centered on the same line as the hole 21 of the ingot mould 14. 12 is a preferred support sustaining the device 13 made in accordance with the present invention. 15 is the edge of the ingot mould and acts as a fixed baffle plate. 16 and 17 are respectively the upper (16) and lower (17) levels of the liquid metal as permitted in the ingot mould and measurable by the device 13 within a field of vision contained between the tracings of broken lines 18 and 19. 20 is a possible safety rim to hold any liquid metal that may spill outside the hole 21 of the ingot mould.

Figure 3:
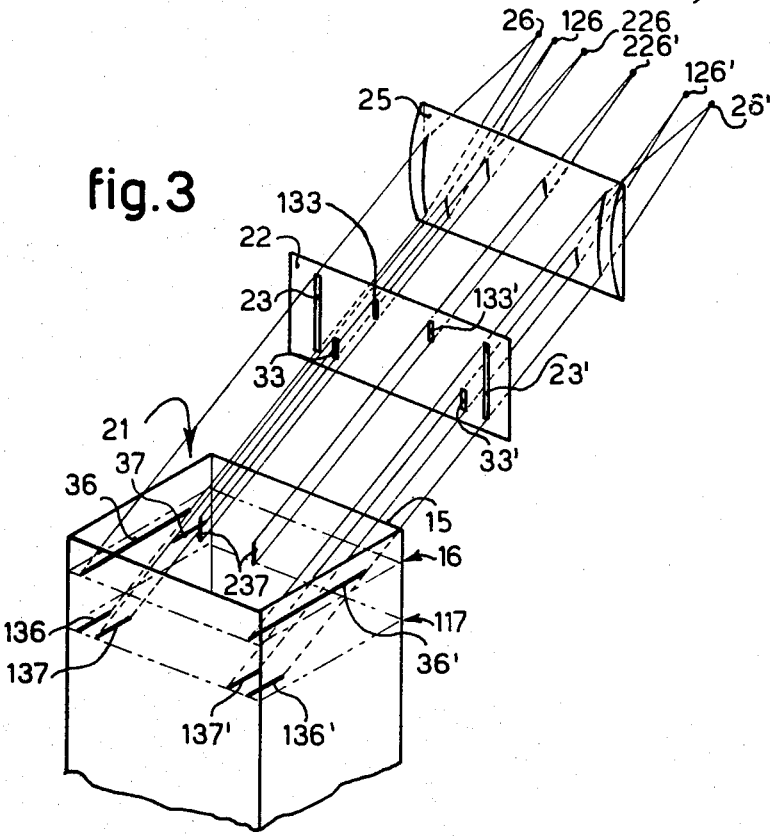
FIG. 3 illustrates the principle on which the device of FIG. 2 is based.
Figure 4:
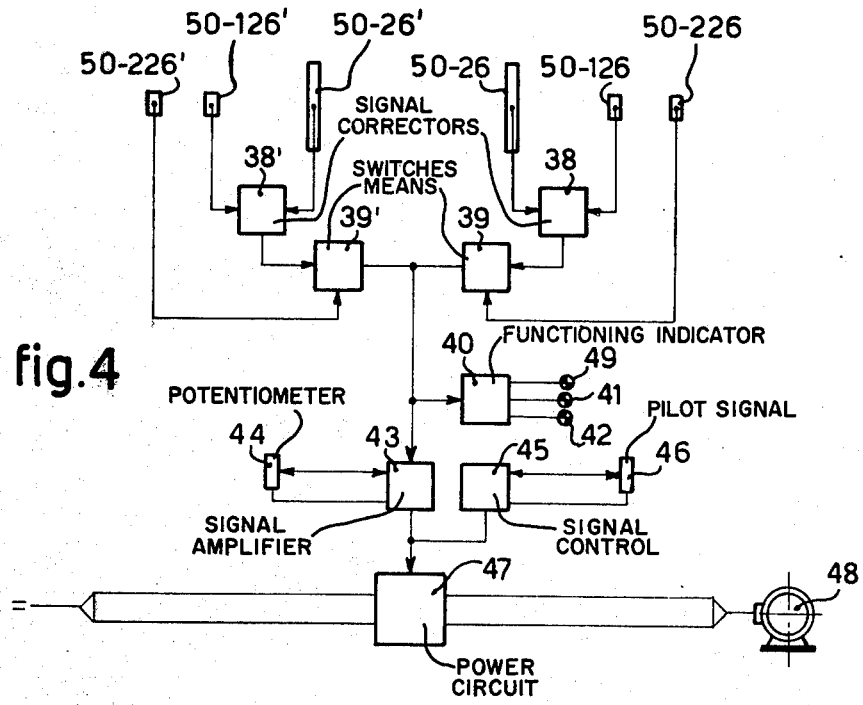
FIG. 4 illustrates a block diagram of the electrical circuit for measuring readings, for comparing and controlling information, the circuit being suitable to be combined with the device of FIG. 2.

Referring to FIG. 2, 22 is the cover containing the limiting windows of the device of this invention, which windows have the function of directing the luminous flow coming from the bath of liquid metal in the ingot mould 14. 23 and 23' are two of the windows in the cover 22; said windows 23 may be linear (FIGS. 7 – 12) or may consist of a plurality of holes having a desired and even elongated section and lying in a position coordinated to form a window. These windows may lie on one single axis or on more than one longitudinal axis. 24 and 24' are the reflecting mirrors that are used when the vision of the bath is obtained from a side as in FIGS. 2 – 7 and 9. 25 and 25' are the lenses which receive the luminous beam arriving through the windows in the cover 22 and which concentrate it at the focus of the lens itself. This lens may be replaced with a plurality of lenses carrying out the same function. With a view to reducing the space that has to be left free for the passage of the beam of radiations, the lens 25 in another variant may be replaced with a combination of lenses (FIGS. 14 and 16) 25-125-225, which provide not only a back focus but also a front focus. 26-126-226 is the back focus of the lens 25 and may coincide with the sensitive part of the photo-element, which in this case is a photodiode or phototransistor, as in FIGS. 3 and 4, while 326 is the front focus in the case of a combined lens. 50 and 50' are the photodiodes lying at the focuses 126, 126' and 226, 226', whilst they lie at the focus 26 only in one layout. In the other layout (FIGS. 5 and 16) they are disposed as a barrier across the ray coming from the lens 25 and lie between the lens itself and its focus 26. 27 is the front part of the housing of the device and is coated inside with opaque, black varnish; it may contain the reflecting mirrors 24, 24' and provides the choice of mounting the cover 22 with the windows either at the side or at the front. 28 is the central part of the container with the front seatings for the lens or lenses 25 and has in its center a separating diaphragm 29 so that there will be no interference between the luminous beam which scans one side of the bath and the other luminous beam which scans the other side of the bath. This part of the housing, like 27, is coated inside with black, opaque varnish and also has projecting parts 31 for its fixture.

The central part 28 may be cooled externally either by means of finning or with circulation of water or another cooling fluid. 30 is the part of the housing that holds the photo-elements as well as the various electrical connections. This part too has the portion corresponding with the inside of the housing coated with an opaque, black varnish so as not to reflect the luminous waves. The part 30 may be cooled with finning or with circulation of cold water. 32 is the container generically and consists of the parts 27–28 and 30. 33 and 33' (FIGS. 7 and 9 and 12 – 13b) are the windows which are substantially punctiform from the point of view of optical effects and are suitable for checking the temperature of the bath. They overlook a fixed area thereof irrespective of its level. 23, 23' are the windows suitable for checking the volume of the bath as seen over the edge 15 of mould 14. 133, 133' are the substantially punctiform windows suitable for examining the position of the flow of liquid metal arriving in the ingot mould 14 through the hole 11. 34 is the front part of the container 32 in a form suitable for examining the bath axially and not by refraction, which latter is the situation in the layout of FIG. 2. In the former case the cover 22 with the windows is positioned at the front, while the cover 22' without windows is positioned laterally and the mirrors 24, 24' are removed. 35 are possible handles for handling. 36 is the area of the bath overlooked above the edge 15 by the window 23 when the bath of liquid metal is at its maximum level 16. 136 is the area of the bath overlooked above the edge 15 by the window 23 when the bath of liquid metal is at its lower level 117; said lower level 117 may also not coincide with the minimum examining level 17. 37 and 137 are the substantially equal areas of the bath of liquid metal that are examined, without interference from the edge 15, by the windows 33 which serve to read the temperature of the bath itself by means of the photo-element 50 positioned at 126. 237 checks the position of the flow. 38 is the means to normalize or correct the signal arriving from the photo-element 50 lying at the focus 26 by means of the signal arriving from the photo-element 50 lying at the focus 126. The latter photo-element, as noted, measures the temperature of the bath, while 138 is the collecting means which is present when there is a plurality of photo-elements 50, as in the layouts of FIGS. 5 and 16. 39 is a possible switch for cutting in or out one or another control circuit; said switch may be activated manually or by the photodiode 50, which checks at 237 through the window 133 the position of the flow of liquid metal arriving in the ingot mould. 40 is the means for indicating the functioning of the device and shows by means of the indicator lights 41–42 and 49 respectively whether the level is as arranged or needs to be adjusted or is outside the minimum or maximum levels. In the latter case it sounds an alarm. 43 is the means that amplifies the signal received from the normalizing or correcting means 38 and also serves to compare said signal with the value of the normal position set in the presetting device 44 (which may, for example, consist of a potentiometer or a digital system or any other system which can be used for the purpose). 43 also serves to emit a signal at its exit which indicates the temporary position of the level of the bath in relation to the nominal position. 45 is the device which maintains the minimum value and which, by comparing the signal coming out from 43 with the pilot signal read in the pre-setting device 46, takes action to ensure in all cases that at least the minimum speed of discharge of metal solidifying in the ingot mould is maintained even if a signal is sent out by 43 which would tend to reduce said speed below the minimum permitted value. 47 is the power circuit and is linked to the signal arriving from 43 and, perhaps, from 45, which latter serves to feed the motor means 48, which in this case consists of a motor fed with direct current. In accordance with a preferred layout the power circuit 47 consists of a semicontrolled Graetz bridge.

The method of functioning is as follows. A continuous flow of metallic liquid comes out of the hole 11 and arrives in an ingot mould 14. When the device includes the windows 133 as well as windows 23 and 33, the photodiodes 50 positioned at 226 are struck through said windows 133 by the luminous beam emitted by the flow and concentrated by the lens 25 at the focus thereof. If the flow of metal appears before one or the other of the windows 133, one or the other of the photodiodes 50 lying at 226 or 226' intervenes and trips the switch 39 and thus leaves only the other measuring and correcting circuit connected up. If the level of the liquid metal reaches the position 16, the photodiode 50 positioned at 26 (or 26') is affected by the maximum luminous emission allowed under normal circumstances, and its signal or the level of current allowed by it to pass will be at its maximum. Connecting-up takes place when the level of metal reaches the position 117 or, indeed, 17. Said signal, however, is normalized and corrected at 38 by the signal which arrives from the photodiode placed at 126 or 126'; said corrected signal serves to correlate the luminous intensity of the bath of metal with the effective temperature thereof, thereby enabling the signal leaving 38 to be made normal or comparable. The signal leaving 39 arrives at 40, where it indicates visibly if everything is in order or not, and also at 43, where it is compared with a pilot value preset in 44.

If this pilot value is higher than the signal arriving from 39, the device for discharging solidifying metal is acted upon by 48 and is controlled in 47 with a reduction in speed that will never be below the minimum-value signal continuously emitted by 45 so as to prevent the creation of difficulties in the ingot mould. If, on the other hand, the pilot signal is lower, the signal arriving from 39 is amplified and activates the power circuit 47, thus increasing proportionally the speed of discharge by means of the conditioning of 48 until the equilibrium between 44 and 39 is restored.

As noted, instead of one single photo-element 50 at 26 and/or 26', there could be a plurality of photo-elements 50 lying between the lens 25 and the focus 26. Such photo-elements 50, which cooperate in substantially the same way with the luminous flow coming from the lens 25, intersect the luminous flow itself. The result of this is that a variation in the level of the liquid in the ingot mould does not cause a variation in the level of luminosity which strikes the photo-element 50 positioned at 26, but does cause a variation in the number of photo-elements which are affected by the luminous beam thus sent out by the bath.

Therefore, if the level of the liquid metal reaches the position 16, all the photo-elements 50 are affected by the luminous emission and the total signal sent out by them will be at its highest under normal conditions. On the contrary, if the level reaches the positions 117 or 17, the photo-elements 50 positioned between the lens 25 and its focus 26 may all be free from any luminous stress.

Moreover, instead of one single lens 25, combined lenses could be provided so as to have two focuses, of which one would be a front focus 326. It is also possible to provide one lens 25 for each photo-element or more than one lens for each window 23, and this would be much more important in the layouts of FIGS. 5 and 16.

Figure 5:
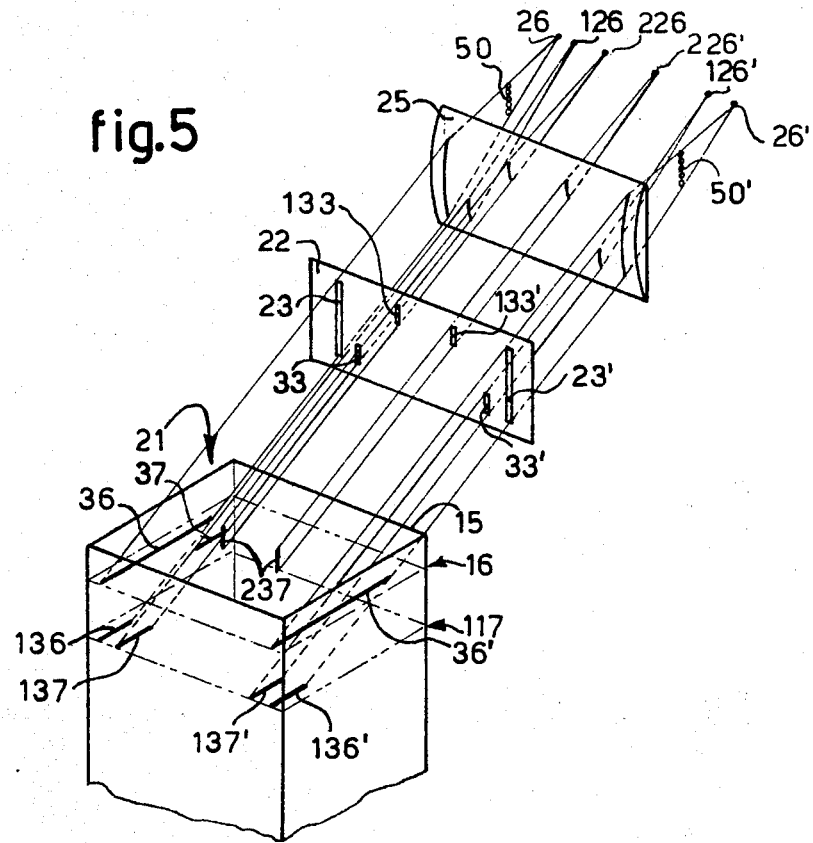
FIGS. 5 and 6 illustrate a variant of the layouts of FIGS. 3 and 4.
Figure 6:
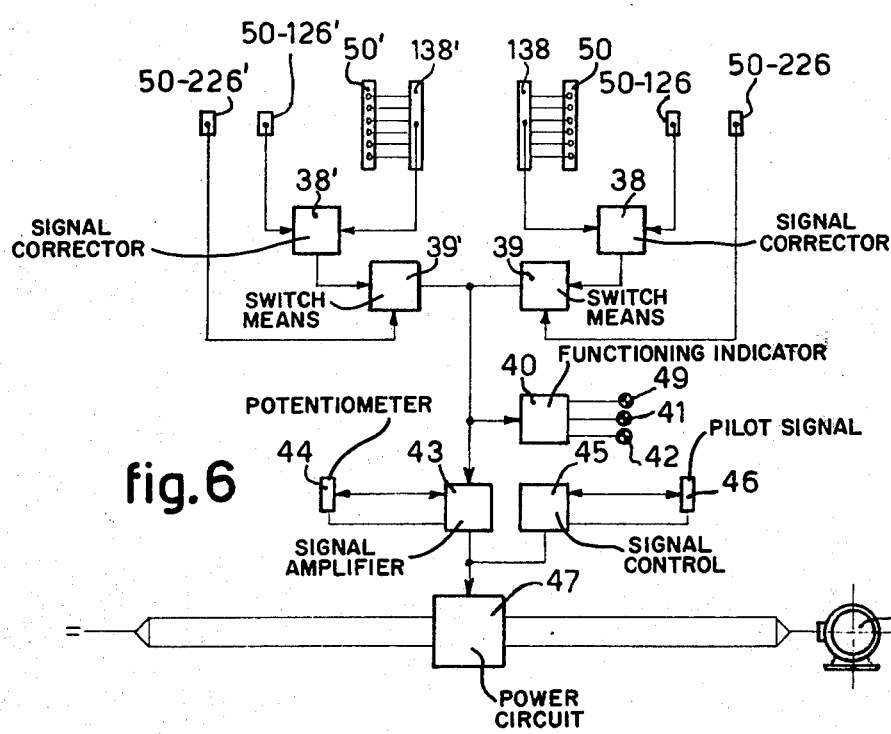

In such a case, and also in the layouts of FIGS. 5 and 16, the photo-elements 50 would each lie at the focus of their own lens. It is also possible to use integrated groups of photo-elements in the layouts of FIGS. 5, 6 and 16, and it would be possible for the photo-elements to lie not on the same axis but on two or more parallel axis and to be staggered so as to provide continuous reception and checking.

We have here described some preferred solutions of the invention, but other solutions are possible. It is possible to vary proportions and sizes. It is possible to apply the device to a servomechanism conditioning the delivery connected to the level of the liquid. It is possible to replace the circuits with integrated circuits. It is also possible to provide digital circuits. It is also possible to install the device without reflecting mirrors. It is further possible to vary some of the reciprocal positions of the various circuits. These and other variants are possible by one skilled in the art without departing from the inventive concept herein developed.

It is claimed:

1. A device for controlling the level in a container of a liquid which will emit infra-red rays comprising in reciprocal coordination and cooperation a housing, at least one longitudinal window constructed and arranged at one end of said housing, at least one photo-element in cooperation with said window for sending out an electrical signal through said window to a liquid in a container, at least a second window constructed and arranged at said one end of said housing which is substantially punctiform, a second photo-element in cooperation with said second window for sending out a pilot signal, and circuitry in cooperation with said photo-elements for correcting, amplifying, and comparing said signals.

2. The device of claim 1 wherein said circuitry includes at least one circuit that corrects the signal indicating the level of the container by means of said pilot signal, at least one circuit for amplifying and comparing the signal flowing from said correction circuit with preset pilot values and a control circuit for amplifying and comparing the signal.

3. The device of claim 1 characterized in that there are two longitudinal windows, each in association with a photo-element.

4. The device of claim 1 wherein a lens in interposed between each of said windows and said photo-elements.

5. The device of claim 1 wherein for each longitudinal window there is a plurality of photo-elements placed between a lens and the back focus thereof in a position across the ray flowing from said lens.

6. The device of claim 1 wherein each of said longitudinal windows is composed of a plurality of elementary windows and there is a plurality of lenses wherein each lens has a back focus and cooperates with at least one photo-element.

7. The device of claim 1 wherein for each longitudinal windows there are two substantially punctiform windows of which each cooperates with a photo-element wherein the first window of said substantially punctiform windows together with a photo-element is affected by the temperature of the container of liquid, whereas the second of said substantially punctiform windows and its photo-element is affected by the position of the flow feeding the liquid in relation to the vertical center of the container of liquid being controlled.

8. The device of claim 7 wherein the liquid is molten metal.

9. The device of claim 1 wherein the lens is a complex lens and has a front focus in a position between the windows and the level of the liquid.

10. The device of claim 1 wherein the circuit for correcting the signal indicating the level of liquid is subject to the control signal arriving at the photo-element which cooperates with the first substantially punctiform window.

11. The device of claim 1 wherein the circuitry includes on and off switches for the measuring group subject to the presence or absence of a control signal arriving at the photo-element which cooperates with the second substantially punctiform window.

12. The device of claim 1 including means for controlling the level in said liquid container.

13. In combination a device for controlling the level in a container of a liquid which will emit infra-red rays and a container having an edge containing liquid which emits infra-red rays, the level of which is to be controlled, comprising in reciprocal coordination and cooperation a device having a housing, at least one longitudinal window constructed and arranged at one end of said housing, said window overlooking a portion of the container made visible over an edge of said container and cooperating with at least one photo-element for sending out an electrical signal through said window to determine the level of liquid in said container, at least one second window at said one end of said housing which is substantially punctiform and overlooks a substantially constant portion of the level of the container containing the liquid within the vertical field of adjustment thereof and which cooperates with a second photo-element for sending out a pilot signal, and circuitry in cooperation with said photo-elements for correcting, amplifying, and comparing the signals thereof, wherein the optical axis of said device is positioned at an angle to a line vertical to the level of the liquid in said container and wherein said longitudinal window cooperates with the edge of said container.

14. The device of claim 13 wherein said circuitry includes at least one circuit that corrects the signal indicating the level of the container by means of said pilot signal, at least one circuit for amplifying and comparing the signal flowing from said correction circuit with preset pilot values and a control circuit for amplifying and comparing the signal.

15. The device of claim 13 characterized in that there are two longitudinal windows, each in association with a photo-element.

16. The device of claim 13 wherein a lens is interposed between each of said windows and said photo-elements.

17. The device of claim 13 wherein for each longitudinal window there is a plurality of photo-elements placed between a lens and the back focus thereof in a position across the ray flowing from said lens.

18. The device of claim 13 wherein each of said longitudinal windows is composed of a plurality of elementary windows and there is a plurality of lenses wherein each lens has a back focus and cooperates with at least one photo-element.

19. The device of claim 13 wherein for each longitudinal windows there are two substantially punctiform windows of which each cooperates with a photo-element wherein the first window of said substantially punctiform windows together with a photo-element is affected by the temperature of the container of liquid, whereas the second of said substantially punctiform windows and its photo-element is affected by the position of the flow feeding the liquid in relation to the vertical center of the container of liquid being controlled.

20. The device of claim 19 wherein the liquid is molten metal.

21. The device of claim 13 wherein the lens is a complex lens and has a front focus in a position between the windows and the level of the liquid.

22. The device of claim 13 wherein the circuit for correcting the signal indicating the level of liquid is subject to the control signal arriving at the photo-element which cooperates with the first substantially punctiform window.

23. The device of claim 13 wherein the circuitry includes on and off switches for the measuring group subject to the presence or absence of a control signal arriving at the photo-element which cooperates with the second substantially punctiform window.

24. The device of claim 13 including means for controlling the level in said liquid container.

25. The method of controlling the level in a container of a liquid which will emit infra-red rays comprising the steps of positioning a control device so that the optical axis of the device is at an angle to a line vertical to the level of the liquid in said container and wherein a longitudinal window in said control device cooperates with the edge of the container, directing an electrical signal through a longitudinal window in said control device positioned longitudinally in relation to the liquid in a container to be measured; directing a second electrical signal through a substantially punctiform window in said control device which will overlook a constant area of said liquid in said container as a pilot signal, correcting the signal indicating the level of the liquid in said container by means of said pilot signal, amplifying and comparing the first signal with the corrected signal.

* * * * *